United States Patent Office 3,000,838
Patented Sept. 19, 1961

3,000,838
PLATINUM REFORMING CATALYST AND PROCESS FOR PREPARING THE SAME
Malden W. Michael, Stamford, Conn., assignor to American Cyanamid Company, New York, N.Y., a corporation of Maine
No Drawing. Filed Oct. 8, 1958, Ser. No. 765,943
5 Claims. (Cl. 252—441)

This invention relates to the manufacture of catalysts, and more particularly to the manufacture of platinum-alumina reforming catalysts.

Platinum catalysts in general are used by the petroluem industry to upgrade virgin naphthas for the production of motor fuels and for the production of aromatic hydrocarbons. A usually preferred naphtha feed is a 200–450° F. cut of Mid-Continent crude, although naphthas from Texas, California and Kuwait, or other crudes may be used. Mid-Continent crudes are quite plentiful, and contain a large amount of naphthenes, as for example, about 40%. These naphthenes are convertible to corresponding aromatics by dehydrogenation under reforming conditions. Other reactions which normally take place in reforming are hydrocracking of paraffins, isomerization of paraffins, and dehydrocyclization of paraffins to aromatics. In a typical reforming run a Mid-Continent crude naphtha having an unleaded octane rating of 35–40 units is converted to a motor fuel which has an octane rating of 85–100 units.

Platinum reforming catalysts and various methods of their manufacture have been suggested heretofore. In general, platinum reforming catalysts containing halogen, and in particular chlorine and fluorine are known as in the fact that the presence of halogen in addition to platinum normally will result in a catalyst having improved reforming activity. In general, the presence of halogen in a platinum reforming catalyst may be achieved as an incident to the manufacture of the alumina base material, or alternatively, it may be added by addition of a halogen containing compound to a suitable alumina base material simultaneously with the addition of a platinum compound to the alumina base material. Thus, the addition with a platinum-containing compound, such as chloroplatinic acid, it may function both as a source of halogen and platinum in a reforming catalyst.

As noted above, in general various processes for the manufacture of such catalysts are widely known, as is the fact that the presence of halogen in a platinum reforming catalyst does, within certain limits, improve reactivity. In general, this is highly advantageous in that increased catalyst activity is achieved through the presence of less expensive halogen ions rather than platinum in the catalyst composition.

While the advantages of added halogen are widely known, its use is not without disadvantage. Thus, it has been found that the employment of relatively large amounts of halogen leads to large amounts of carbon formation or coke laydown on platinum-alumina catalysts, usually with the resulting rapid decline in the activity of such platinum reforming catalysts.

Accordingly, it is an object of the present invention to provide a method whereby the effects of relatively small amounts of halogen, and in particular, fluorine in a platinum reforming catalyst may be unexpectedly magnified with respect to the activity of the final platinum alumina catalyst.

It is a further object of the present invention to provide a platinum containing reforming catalyst having added halogen and in particular, added fluorine, which has substantially the same measure of activity of prior art platinum reforming catalysts containing added halogen, but containing a substantially smaller amount of said halogen therein.

It is a still further object of the present invention to provide a process which is relatively simple, readily adaptable to present plant equipment whereby the objects referred to above may be achieved with a minimum of inconvenience and added handling of catalyst material.

These and other objects and advantages will become more apparent from the detailed description of the present invention set forth hereinbelow.

According to the present invention a process is provided for improving the activity of platinum-alumina reforming catalysts, which comprises impregnating an aged alumina constituting from between about 20% and about 80% of the $Al_2O_3$ content of the final catalyst composition with a solution of a halogen containing compound. The solution of the halogen-containing compound, which is preferably one containing fluorine is added to said aged alumina in an amount sufficient to add between about 0.1 and about 0.5% halogen based on the weight of the final catalyst composition. The impregnated alumina is dried and then mixed with additional aged alumina that is not impregnated with halogen, which additional dry aged alumina constitutes from between about 20% and about 80% of the $Al_2O_3$ of the final catalyst composition. The impregnated alumina and the dried non-impregnated alumina are then thoroughly co-mingled or mixed to insure the uniformity of this intermediate composition material.

Thereafter, this intermediate composition is thoroughly co-mingled or mixed with a solution of a platinum compound to achieve a thorough impregnation therewith. The platinum compound, which is preferably chloroplatinic acid may be others known to those skilled in the art, as for example, platinum tetrachloride, and the like, is employed in an amount sufficient to provide from between 0.05% and about 1% of platinum based on the weight of the catalyst compositon. After mixing, the catalyst composition is dried, pelleted, and the pellets calcined.

"Aged alumina," as that term is employed herein, is intended to include alumina which has been converted to eta alumina in form by calcination, or alumina which may be converted to the eta form by calcination. The "aged alumina" is obtained by aging alumina sol at elevated pH and temperature in accordance with various prior art procedures.

The alumina sol may be prepared in accordance with any of a number of prior art procedures, as for example, those described in U.S. Patent No. 2,258,099 or Reissue Patent No. 22,196. These sols, if dried and calcined before aging, are normally converted to gamma alumina. If the same amorphous sol is aged with ammonia at elevated pH and temperatures for significant periods of time, beta alumina trihydrate is formed. If the trihydrate is subsequently dried and calcined, the resulting alumina is in substantially the eta form.

Aged alumina, capable of being converted to eta alumina by the general procedure above, are generally known and have been employed as bases for platinum reforming catalysts. (See British Patent No. 787,755, which is incorporated herein by reference.) In addition, such aged alumina may be prepared in accordance with British Patent No. 735,390. The desirability of employing such alumina in platinum reforming catalysts is predicated on the improved activity of said catalysts employing such alumina over alumina sols which convert on calcination to gamma alumina.

It should be noted here that it is not important how the alumina sol is aged, but rather that the aged alumina employed in this invention has either been calcined and converted to eta alumina or is an aged sol, which upon calcination is converted to eta alumina.

Aged alumina sols employable and in accordance with the process of the present invention are preferably impregnated with halogen while in the dry state, although impregnation of the filter cake is also fully contemplated. In this connection, it should be noted that the essential aspect of halogenation is that the halogen be added to an aged alumina sol, i.e., one that has been converted to eta alumina by calcination, or one that may be converted to eta alumina by calcination. Drying may normally be accomplished by employing temperatures of the order of 250° F. for periods of time of from between 12 and 18 hours until the sol material is dry to the touch. Normally, such materials contain on the order of up to about 40% moisture, though frequently the moisture content is of the order of 15 to 30%. These sols are dry to the touch.

As will be noted from the general description of the invention set forth hereinabove, it is an important aspect of the present invention that a portion of the alumina of the final catalyst composition is impregnated with a relatively high concentration of a halogen containing material such as hydrogen fluoride solution, and that when this impregnated portion is mixed with an untreated portion of aged alumina, and the mixture platinized, the level of activity of the final catalyst composition is substantially the same as the level of activity of a catalyst containing a much larger amount of halogen without the disadvantages of the presence of larger amounts of halogen.

It has been determined that in accordance with the present invention, that the halogen impregnated portion of aged alumina should constitute from between about 20% and about 80% of the $Al_2O_3$ in the final catalyst compositon. While these percentages are believed to represent the limits in either direction as will appear more clearly hereinafter, slight modifications with respect to these limitations may be employed and still desirable results will accrue. Preferably, the amount of aged alumina impregnated should constitute from between about 40 and 60% of the $Al_2O_3$ content of the final catalyst composition.

The added halogen is normally introduced into the aged alumina in the form of an aqueous solution and preferably as a solution of hydrogen fluoride. In general, the halogen employed may be either fluorine or chlorine, and it may be introduced preferably as aqueous solutions of compounds containing these elements such as hydrogen chloride, aluminum chloride, hydrogen fluoride, aluminum fluoride, fluorosilicic acid, and the like. While the employment of chlorides in accordance with the present invention does to some extent result in the use of less chlorine to achieve substantially equivalent activity with respect to prior art chlorine containing catalysts, the advantages of the present invention are most pronounced when fluoride is employed as an impregnating agent.

The impregnation of the aged alumina should be conducted in such a manner that the fluoride is present throughout the alumina. As indicated, impregnation of a portion of the aged alumina is preferably accomplished by employing an aqueous solution of the halogen containing compound, usually at room temperature, although elevated temperatures may be employed.

The amount of halogen added to alumina is sufficient to add from about .1% up to .5% by weight of halogen as fluoride (somewhat higher for chloride) based on the weight of the final catalyst composition, and preferably an amount from between about 0.2% up to about .4%, based on the weight of the final catalyst composition. Additions resulting in amounts in excess of 0.6% of fluoride based on the weight of the final catalyst composition are excessive insofar as catalysts prepared in accordance with this invention.

As noted above, after halogenation, the impregnated alumina is dried. The thoroughly impregnated portion of dry alumina is then thoroughly and uniformly mixed with a second portion of dry aged alumina, which portion may constitute from between about 80% and about 20% of the $Al_2O_3$ content of the final catalyst composition, and more preferably an amount from between about 60 and about 40% of the $Al_2O_3$ composition of the final catalyst composition.

After mixing the impregnated and non-impregnated portion of alumina, the composition is then platinized with a solution of a platinum compound, such as platinum tetrachloride, chloroplatinic acid or the like, in such an amount to provide from between about 0.05% and about 1% of platinum based on the weight of the final catalyst composition, and more preferably in such an amount that the amount of the platinum in the final catalyst is between about 0.1 and abou 0.6%.

The resulting impregnated composition is then dried, as for example, for from 12 to 18 hours at some 250° F., a lubricant added, and the catalyst material pelletized. Thereafter, the pellets may be calcined, as for example, for from between 900° and 1200° F. in accordance with conventional prior art techniques. This calcination converts the alumina to the eta form.

In order to illustrate the present invention, the following examples are given primarily by way of illustration. No enumerations of detail found therein should be construed as limitations on the present invention, except as they appear in the appended claims. All parts and percentages contained therein are by weight unless otherwise clearly indicated.

EXAMPLE 1

To 8 pounds of ammonia aged sol filter cake containing 21% $Al_2O_3$, there was added with mixing 15.6 grams of 49% hydrogen fluoride. The material was dried at 250° F. overnight, calcined to 500° F. and granulated to pass through a forty mesh screen. Calcination at 500° F. partially converts the alumina to the eta form. This material contained 68% $Al_2O_3$ and 0.6% fluoride based on the weight of the $Al_2O_3$ content.

294 grams of the above powder was added with mixing to a solution containing 0.8 gram platinum as $H_2PtCl_6$ (chloroplatinic acid) in 184 grams water. After all the powder had been added, a solution of 1 gram $(NH_4)_2S$ solution in 6 grams of water was added and the mass mixed for 15 minutes. It was then dried overnight at 250° F., granulated and formed into 1/8" x 1/8" pellets after adding a lubricant. The pellets were then calcined to 1100° F. to remove the lubricant and activate the catalyst. The catalyst contained 0.4% Pt and 0.6% F.

EXAMPLE 2

In this preparation the hydrogen fluoride was added to the oven-dried, granulated alumina instead of to sol filter cake.

260 grams of oven-dried ammonia aged alumina sol was added to a solution of 2.5 grams of 49% hydrogen fluoride in 196 cc. of water and the resulting mass was dried at 250° F. for 16 hours. It was then granulated and added with mixing to a solution of 0.8 gram platinum as $H_2PtCl_6$ in 180 grams water. 1 gram $(NH_4)_2S$ in 6 grams of water was then added and the mass dried overnight, formed into pellets and calcined at 1100° F.

The catalyst contained 0.4% by weight of platinum and 0.6% by weight of F.

EXAMPLE 3

The same procedure that was employed in Example 2 was employed here, except that the amount of fluorine was 0.3%, based on the weight of the final catalyst composition.

EXAMPLE 4

The same procedure that was employed in Example 2 was employed here, except that the amount of fluorine was 1.2%.

Table I hereinbelow, which embodies test information on catalysts prepared as in Examples 1–4 hereinabove, illustrates that high activity of platinum-alumina reforming catalysts may be achieved by employing prior art procedures, but that when fluorine is present in amounts contemplated by the present invention (less than 0.6% F.) the activity of the resulting catalyst is markedly and unacceptably inferior. Still further, Table I illustrates the amount of carbon or coke laydown on these catalysts is, in general, proportional to the amount of fluorine thereon. (See reference to Examples 1 and 4.)

Table I

| Example | Percent Pt | Percent HF | Percent C | 0–20 hr. 200 p.s.i. Activity |
|---|---|---|---|---|
| 1 | .4 | .6 | | 218 |
| 2 | .4 | .6 | 3.5 | 195 |
| 3 | .4 | .3 | | 124 |
| 4 | .4 | 1.2 | 13.6 | 53 |

EXAMPLE 5

Hydrogen fluoride was added to ammonia aged sol filter cake as in Example 1, and then dried and granulated. The granulated powder contained 68% $Al_2O_3$ and approximately 0.6% of F.

147 grams of this material was thoroughly mixed with 131 grams of granulated ammonia aged sol powder containing 76.3% $Al_2O_3$ and poured with mixing into a solution containing 0.8 gram Pt as chlorplatinic acid ($H_2PtCl_6$) in 184 grams water. 1 gram $(NH_4)_2S$ in 6 grams of water was then added. The composition was dried at 250° F., a lubricant added, formed into pellets and the pellets calcined at 1100° F., converting the alumina to the eta form. The catalyst contained 0.3% of fluorine and 0.4% platinum.

EXAMPLE 6

Hydrogen fluoride was used to impregnate powdered aged alumina sol, after which the impregnated composition was dried. The amount of HF was sufficient to provide .6% of F, based on the weight of this final catalyst composition. This material was then mixed 50–50 with dry ammonia aged alumina sol that had not been impregnated with hydrogen fluoride, and the resulting mixture platinized so that the final catalyst contained .4% of platinum.

EXAMPLE 7

130 grams ammonia aged alumina sol powder containing 77% $Al_2O_3$ was poured into a solution of 0.8 gram Pt as $H_2PtCl_6$ in 92 grams of water. The platinized alumina was dried at 250° F. overnight, ground and mixed with 130 grams powder containing 77% $Al_2O_3$ and 0.6% of hydrogen fluoride based on the weight of $Al_2O_3$.

The mixture was formed into pellets and calcined at 1100° F. The catalyst contained 0.4% Pt and 0.3% F.

EXAMPLE 8

The same procedure as in Example 6 was employed except that the alumina employed as a base had not been aged and the final calcined catalyst contained gamma alumina instead of the eta alumina of the catalyst of this invention. The final catalyst composition contained .4% Pt and .3% F.

EXAMPLE 9

The same procedure as in Example 7 was employed except that a hydrogen fluoride impregnated dried aged sol was platinized and this material was then mixed with an equal weight $Al_2O_3$ as dry aged sol which had not been impregnated with hydrogen fluoride. Thereafter, the material was pelleted and calcined at 1100° F. The final catalyst composition contained .4% of Pt and .3% of F.

EXAMPLE 10

The same procedure that was employed in Example 6 was employed here except that 25% of the $Al_2O_3$ as dry aged alumina sol was impregnated with hydrogen fluoride solution, and this material was thoroughly blended with 75% by weight of the final catalyst composition of $Al_2O_3$ as dry aged alumina sol. The mixture was then platinized, dried, pelleted and calcined at 1100° F. The final catalyst contained 0.15% F and .4% Pt.

EXAMPLE 11

The same procedure as was employed in Example 10 was employed here except that 75% of the $Al_2O_3$ of the final catalyst composition as dry aged sol was impregnated with hydrogen fluoride. The impregnation was sufficient to provide .45% F based on the composition of the final catalyst, which also contained .4% of Pt.

EXAMPLE 12

The same procedure as was employed in Example 11 was employed here except that 50% of the $Al_2O_3$ of the final catalyst as dry aged sol was impregnated with hydrogen fluoride. This composition was then mixed with an additional 50% by weight of dry aged alumina sol, and this mixture was then platinized. The impregnation was sufficient to provide 0.3% F based on the composition of the final catalyst which also contained 0.8% Pt.

Table II hereinbelow, which embodies test information on catalysts prepared in Examples 5–12 above, illustrates several important aspects of this invention. In the first instance, Examples 5 and 10–12 illustrate that high activity can be obtained employing the process of this invention with substantially smaller amounts of fluorine present in the catalyst compared with values in Table I. Conversely, the table illustrates that when the amount of fluorine added employing the process of this invention equals amounts normally employed in the prior art in the final catalyst composition, the activity is unacceptably low. (See Example 6.) Additionally, the significance of the order of addition is pointed out in Examples 8 and 9 from which it can be seen that the fluorinated component must be first mixed with a non-fluorinated dried alumina sol and this mixture platinized. Example 7 illustrates the invention is not applicable to gamma alumina platinum reforming catalysts, while Examples 10–12 illustrate that fluorine impregnated alumina and non-fluorine impregnated alumina may be mixed over relatively wide proportions by weight prior to platinizing, and the unexpected effect of the present invention achieved.

Table II

| Example | Percent Pt | Percent HF | Percent C | 0–20 hr. 200 p.s.i. Activity |
|---|---|---|---|---|
| 5 | .4 | .3 | | 189 |
| 6 | .4 | .6 | 3.8 | 119 |
| 7 | .4 | .3 | 1.8 | 117 |
| 8 | .4 | .3 | 1.3 | 89 |
| 9 | .4 | .3 | | 152 |
| 10 | .4 | .15 | | 171 |
| 11 | .4 | .45 | 1.8 | 177 |
| 12 | .8 | .3 | 2.2 | 261 |

In Tables I and II above, the test values recorded with respect to activity are determined in accordance with a hydroforming or reforming test under standardized conditions, employing 50 milliliters of catalyst in a quasi-isothermal reaction zone surrounded by an electrically heated block for temperature control. The tests were carried out at a catalyst outlet temperature of 920° F. (493° C.), a pressure of 200 pounds per square inch gauge, an hourly weight space velocity of 2, and a once-through hydrogen rate of 5,000 standard cubic feet per barrel of feed. The feed was a Mid-Continent virgin naphtha having an ASTM distillation range of 210 to 356° F. (99 to 170° C.), a CFR–R octane number of 44.0, an API gravity of 55.2°, a Reid vapour pressure of 1.1 pounds per square inch, and a composition consisting of 50.0 percent by volume of paraffins, a trace of olefins, 41.5 percent naphthenes, 8.5 percent aromatics, 0.028 percent sulfur, and 0.01 percent nitrogen (Kjeldahl). The catalyst activity was calculated as the relative quantity, expressed as a percentage, of an arbitrarily chosen standard catalyst required to produce a $C_5+$ product fraction having the same octane number under the same test conditions.

I claim:

1. A process for improving platinum-alumina reforming catalysts having high activity and low fluorine content, which comprises impregnating aged alumina sol constituting from between about 20% and about 80% of the $Al_2O_3$ content of the final catalyst composition with fluoride, said impregnation being sufficient to add from between above about 0.1 and less than about 0.6% of fluoride by weight to the final catalyst composition, thoroughly mixing said impregnated sol with dry aged alumina sol that has not been fluoride impregnated, said additional alumina constituting from between about 80% and about 20% of the $Al_2O_3$ content of the final catalyst composition, co-mingling the mixture with a solution of a platinum compound, said platinum compound being sufficient to provide from between 0.05% and 1% of platinum based on the weight of the final catalyst composition, drying the resulting mixture, pelleting the mixture and calcining the pellets.

2. A process according to claim 1, wherein fluoride is employed in amounts sufficient to provide from between 0.2 and 0.4% of fluorine on the weight of the final catalyst composition.

3. A process according to claim 1, in which the alumina that is impregnated with fluoride contains from between 40 and 60% of the $Al_2O_3$ content of the final catalyst composition.

4. A process according to claim 1, in which the fluoride impregnated aged alumina is dry before impregnation.

5. A platinum-alumina reforming catalyst characterized by high activity and low fluoride content, containing from between above about 0.1 and less than about 0.6% of fluoride and between about 0.05 and 1% of platinum prepared by impregnating aged alumina constituting between about 20% and about 80% of the $Al_2O_3$ content of the final catalyst composition with from between above about 0.1 and less than about 0.6% of fluoride, mixing said impregnated sol with from 80% to 20% of dry aged alumina sol that has not been impregnated with fluoride, co-mingling the mixture with an aqueous solution of a platinum compound, forming catalyst pellets from said co-mingled mixture and thereafter drying and calcining said pellets.

References Cited in the file of this patent

UNITED STATES PATENTS

| | | |
|---|---|---|
| 2,759,897 | Haensel | Aug. 21, 1956 |
| 2,785,141 | Fleck | Mar. 12, 1957 |
| 2,840,529 | Lefrancois | June 24, 1958 |
| 2,863,825 | Engel | Dec. 9, 1958 |
| 2,865,837 | Holcomb et al. | Dec. 23, 1958 |